Patented Oct. 30, 1928.

1,689,891

UNITED STATES PATENT OFFICE.

EMILE MARCEL ROCHE, OF CASTELNAU-LE-LEZ, FRANCE, ASSIGNOR TO URBAIN BELLONY VOISIN, OF CETTE, FRANCE.

PROCESS OF PRODUCING CALCIUM ALUMINATE CEMENT.

No Drawing. Application filed December 4, 1924, Serial No. 754,003, and in France May 6, 1924.

Mixtures of bauxite and calcareous materials employed for the manufacture of aluminous cements, generally melt at a temperature very close to their point of softening or clinkering contrary to what is the case for Portland cement mixtures, for example.

It follows that processes applicable to the manufacture of these last mentioned cements do not give good results in the case of aluminous cements, the substance being liable to melt partially and then adhering to the walls of the kiln in such a manner as to impede the operation of burning This moreover is the reason why the obtaining of aluminous cements has hitherto been confined to the employment of fusion processes, by means of the electric furnace and water jacket amongst others, which are expensive processes by reason of the great waste of heat involved.

The process according to the present invention is more economical. It consists in heating an alumino-calcareous mixture, suitably proportioned, to a low temperature during a long period; a temperature of 900° to 1000° C. and a duration of 9 to 12 hours appear to give the best results, these examples being in no way limitative.

Under these conditions, partial melts are avoided and the mass uniformly undergoes a change in which the material comes together as an agglomerate but does not enter that stage at which vitrification begins to occur. When in this condition it is softer than the usual clinker, therefore more easily ground, besides which it is non-adhesive to the walls of the retort in which it is roasted.

This binder by reason of its alumino-calcareous composition resists sea water and selenitic waters. It possesses, moreover, by reason of the particular conditions of its burning, a certain number of excellent qualities, among which the most remarkable is the rapidity of its hardening. It can be utilized immediately after grinding, without it being necessary to allow it to remain stored in pits for a greater or less time. It is much less fragile than ordinary aluminous cements and its shrinkage is almost nil.

*Example.*—Starting with a finely ground and sifted mixture of 33% fat lime and 67% of bauxite, this when perfectly uniform is watered and agglomerated into briquettes of ordinary dimensions; these briquettes after drying are burned at 900° C. in a continuous lime-kiln with natural draught, for from 9 to 12 hours.

The fritted material, obtained on withdrawal from the kiln, after grinding and sifting, yields a cement which, even after only 24 hours, presents a very high resistance, its strength continuing to increase with the lapse of time. Its duration of setting varies between 6 and 8 hours. This binder, immersed in sulphated solutions or in pure water, does not undergo any deformation.

The buring can be effected in any suitable kind of kiln; briquetting can be avoided by employing a rotating furnace. The composition of the calcareous bauxite or lime-bauxite mixture can be varied.

What I claim is:

1. A process for the manufacture of an aluminous cement, comprising, burning a mixture of bauxite and a calcareous material at a temperature of about 900 to 1000 degrees centigrade, during a long period.

2. A process for the manufacture of an aluminous cement, comprising, burning a mixture of bauxite and a calcareous material at a temperature of about 900 to 1000 degrees centigrade. during about 9 to 12 hours.

3. A process for the manufacture of an aluminous cement, comprising, burning a mixture of bauxite and a lime at a temperature of about 900 to 1000 degrees centigrade, during a long period.

4. A process for the manufacture of an aluminous cement, comprising, burning a mixture of bauxite and a lime at a temperature of about 900 to 1000 degrees centigrade, during about 9 to 12 hours.

In testimony whereof I have signed my name to this specification.

EMILE MARCEL ROCHE.